May 10, 1938.                C. R. SODERBERG                2,117,107
                          TURBINE BLADE LASHING
                       Original Filed Sept. 28, 1935
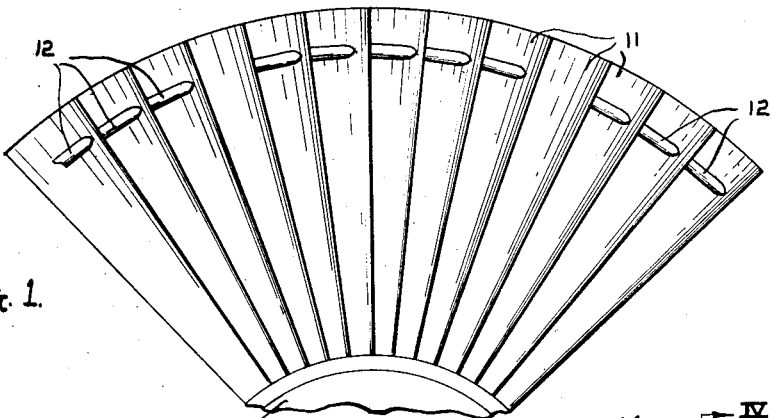
FIG. 1.
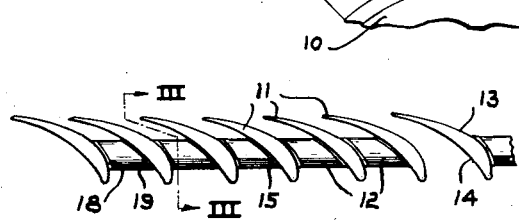
FIG. 2.
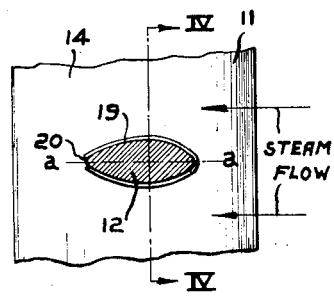
FIG. 3.
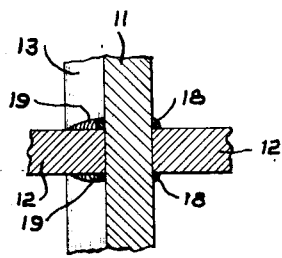
FIG. 4.
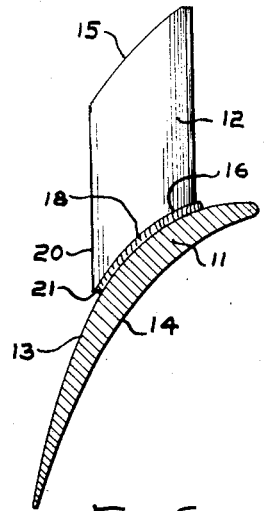
FIG. 6.
FIG. 5.
WITNESSES:
James K. Mosser
Edward L. Roth
INVENTOR
CARL R. SODERBERG.
BY
a. B. Reeves
ATTORNEY Patented May 10, 1938

2,117,107

UNITED STATES PATENT OFFICE 2,117,107

TURBINE BLADE LASHING

Carl R. Soderberg, Swarthmore, Pa., assignor to Westinghouse Electric & Manufacturing Company, East Pittsburgh, Pa., a corporation of Pennsylvania Original application September 28, 1935, Serial No. 42,596. Divided and this application January 30, 1937, Serial No. 123,084

1 Claim. (Cl. 29—156.8)

My invention relates to turbine blading and it has for an object to provide improved method of assembly of blading and lashing. This application is a division of application Serial No. 42,596, filed September 28, 1935 for Turbine blade lashing.

Heretofore, it has been common practice to modify the blades of a turbine to receive the lashing. In many cases, the blades have been punctured or notched to receive lashing. Also, the lashing has been formed by providing lugs or blades and connecting the lugs together. It has also been proposed to rivet lashing elements to blades. In these prior arrangements, some modification of the blade has been required—it is either punctured or notched to receive a wire or rivets or it must be specially manufactured for the purpose. Puncturing or notching of the blade is objectionable because the blade is thereby weakened, and forging a blade with special protuberances or lugs thereon complicates and makes for a more costly process of manufacture. In accordance with my invention, however, no modification or alteration of the blade is required, the lashing elements having the ends thereof shaped to fit the blade faces and the ends being connected to the blades by means of weld beads, which substantially encompass the ends of the lashing elements and join the latter to the blade faces. The lashing is streamlined, or ichthyoidal, in cross-section with the major axis extending in the direction of steam flow. A further object of my invention is to provide blade lashing having these advantageous features.

More particularly, in accordance with my invention, the lashing elements or members are formed separately from the blades, each element or member having concave and convex end faces to fit the convex and concave faces, respectively, of the blades. Before assembling the blades, the lashing elements or members have their concave ends brought into proper relation with respect to convex faces of the blades and welded thereto to provide blade and lashing member units. The units are assembled in rows on the rotor, the convex ends of the lashing members fitting concave faces of the blades; and, after assembly, the convex ends of the lashing members are welded to the concave blade faces, welding being preferably effected from the inlet side of a blade row. In a blade row, lashing members are omitted at intervals so that the blading of a row is comprised by a plurality of groups in order to provide for expansion and contraction and to reduce vibration. Furthermore, the lashing is so located relatively to the blade height as to minimize vibration. Accordingly, a further object of my invention is to provide a method of blade and lashing assembly wherein the blades of each row are arranged as circumferentially spaced segmental groups with the blades of each group lashed together by means of lashing members having convex and concave ends fitting convex and concave blade faces and welded to the latter.

These and other objects are effected by my invention as will be apparent from the following description and claim taken in connection with the accompanying drawing, forming a part of this application, in which:

Fig. 1 is a view in side elevation showing a plurality of blades with my improved lashing applied thereto;

Fig. 2 is a plan view of apparatus shown in Fig. 1;

Fig. 3 is a section taken along the line III—III of Fig. 2 and viewed in the direction of the arrows;

Fig. 4 is a detail view taken along the line IV—IV of Fig. 3 at the lashing;

Fig. 5 is a side elevational view of one of the lashing members; and,

Fig. 6 is a view showing a blade with a lashing member connected thereto.

Referring now to the drawing more in detail, I show a turbine spindle 10 having a plurality of blades 11 of a row with lashing elements 12 alternately arranged with respect to the blades 11 and connected thereto.

The blades 11 have the usual convex and concave faces 13 and 14. The lashing members 12 have the ends thereof shaped to fit the blade faces, the convex end 15 fitting the concave blade face 14 and the concave end 16 fitting the convex blade face 13. Each lashing member or element has a peripheral boundary surface defining a uniform cross-sectional area. Thus, it will be seen that the blade section is in no way modified for provision of the lashing, the lashing elements having the ends thereof shaped to fit the concave and convex faces of the blades. The ends of the lashing elements 12 are connected to the convex and concave blade faces by means of bead welds 18 and 19, respectively, which substantially encompass the ends of the lashing elements and join the latter to the blade faces.

The weld beads 18 and 19 are shown to larger scale and more in detail in Fig. 4, from which it will be seen that the beads form fillets in the corner spaces between blade faces and lashing elements.

As shown in Fig. 3, the lashing is preferably streamlined, or ichthyoidal, in cross-section to assure maximum lashing strength with minimum losses due to interference with steam flow, this result being secured by arranging the lashing members between blades in such manner that the major axes $a$—$a$ thereof extend in the direction of steam flow.

To facilitate assembly of blading and of lashing of the character herein described, each lashing member preferably has its concave end 16 brought into proper relation with respect to the convex face 13 of a blade 11, it being possible to locate the lashing member with respect to a blade by means of a suitable jig. It will be readily apparent that this process of assembly facilitates connection of the lashing members to the blades to form blade and lashing member units, for, by having each lashing member connected to a blade before assembly of the blades in a row, it is assured that the lashing members are effectively held in position for welding of the convex ends thereof to concave blade faces. The lashing members of each blade row are arranged to connect the blades in arcuate groups or segments as shown in Figs. 1 and 2, to provide for expansion and contraction of effects and to secure desired elastic properties.

With a lashing member held in proper relation with respect to a convex blade face, a weld bead 18 is formed around the end of the lashing member adjacent to the blade except for the back or thin discharge edge 20 of the lashing member, the latter preferably having its corner 21 relieved and welding being omitted at that corner to avoid possible burning of the thin edge of the lashing.

The blade and lashing member units are next assembled with respect to the turbine rotor, the convex end 15 of each lashing member being trimmed, if necessary or desirable, suitably to fit the adjacent concave face of a blade incident to assembly of the blades with respect to the turbine rotor. Then, the convex ends of the lashing members 12 are welded to the concave faces of the blades by means of bead welds 19 surrounding the end of the lashing member except for the extreme back thin edge portion of the member. As each blade row is comprised by a plurality of circumferentially spaced segmental groups of blades, wherein the blades of each group are connected together by the lashing members to form a unitary construction, in assembling a row, units are arranged in segmental groups separated by blades without lashing members and the convex ends of lashing members are then welded to concave faces of blades.

In welding the convex ends of the lashing members to the adjacent concave faces of the blades, access for welding is had from the inlet side of a blade row, since maximum room for welding is afforded from that side. The lashing members have their concave end faces connected to the convex faces of the blades to provide blade and lashing member assemblies or units for several reasons: a convex face is more easily trimmed to fit a concave blade face; the convex ends of the lashing members may be more readily manipulated or displaced to bring them into proper relation with respect to concave blade faces because of the relatively long leverage making deflection of an assembly or unit fairly easy incident to fitting of a convex lashing member end to a concave blade face; and welding of the convex ends to the concave blade faces, after assembly of units, may be more easily effected than welding of concave faces of the lashing elements to convex blade faces.

While I have shown my invention in but one form, it will be obvious to those skilled in the art that it is not so limited, but is susceptible of various other changes and modifications without departing from the spirit thereof, and, I desire, therefore, that only such limitations shall be placed thereupon as are imposed by the prior art or as are specifically set forth in the appended claim.

What I claim is:

The method of providing lashing for a turbine blade row, wherein the blades are arranged in circumferentially spaced segmental groups and the blades of each group are lashed together to provide a unitary segmental construction, which comprises forming lashing members with concave and convex ends to fit convex and concave faces of the blades, welding the concave lashing member ends to convex blade faces to form blade and lashing member units, assembling units in segmental groups separated by blades without lashing members so as to provide a blade row made up of segmental groups of blades having the concave faces thereof arranged contiguously to convex lashing member ends, and welding the convex ends of the lashing members to concave blade faces.

CARL R. SODERBERG.